(12) United States Patent
Nittur et al.

(10) Patent No.: US 9,401,848 B2
(45) Date of Patent: *Jul. 26, 2016

(54) STATELESS FLEXIBLE BOOT CONTROL

(71) Applicant: Cisco Technology, Inc., San Jose, CA (US)

(72) Inventors: Gururaja A. Nittur, Karnataka (IN); Dmitry Barsky, San Jose, CA (US); Matthew Eli Lazarowitz, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/633,584

(22) Filed: Feb. 27, 2015

(65) Prior Publication Data

US 2015/0172128 A1 Jun. 18, 2015

Related U.S. Application Data

(63) Continuation of application No. 13/705,403, filed on Dec. 5, 2012.

(51) Int. Cl.
*G06F 9/44* (2006.01)
*H04L 12/24* (2006.01)
*H04L 29/12* (2006.01)

(52) U.S. Cl.
CPC ............ *H04L 41/0893* (2013.01); *G06F 9/441* (2013.01); *G06F 9/4408* (2013.01); *G06F 9/4416* (2013.01); *H04L 61/2023* (2013.01)

(58) Field of Classification Search
CPC .. G06F 9/4406; G06F 9/4408; G06F 11/2053
See application file for complete search history.

(56) References Cited

U.S. PATENT DOCUMENTS

| | | | |
|---|---|---|---|
| 6,292,890 B1 * | 9/2001 | Crisan | 713/2 |
| 6,857,069 B1 | 2/2005 | Rissmeyer et al. | |
| 7,363,356 B1 | 4/2008 | Rissmeyer et al. | |
| 7,769,990 B1 | 8/2010 | Okcu et al. | |
| 2003/0233535 A1 * | 12/2003 | Nunn | G06F 9/4408 713/1 |
| 2004/0093489 A1 | 5/2004 | Hsu | |
| 2004/0215949 A1 * | 10/2004 | Dennis et al. | 713/1 |
| 2005/0027977 A1 * | 2/2005 | Taylor | 713/2 |
| 2005/0108515 A1 | 5/2005 | Rangarajan et al. | |
| 2005/0204181 A1 | 9/2005 | Montero et al. | |
| 2006/0179294 A1 * | 8/2006 | Chu et al. | 713/2 |
| 2006/0265580 A1 | 11/2006 | Dennis et al. | |
| 2007/0101116 A1 * | 5/2007 | Tsuji | 713/1 |
| 2009/0037722 A1 | 2/2009 | Chong et al. | |

(Continued)

*Primary Examiner* — Kim Huynh
*Assistant Examiner* — Brandon Kinsey
(74) *Attorney, Agent, or Firm* — Edell, Shapiro & Finnan, LLC

(57) ABSTRACT

Techniques are provided herein for optimizing boot order for devices in a data center environment. These techniques may be embodied as a method, apparatus and instructions in a computer-readable storage media to perform the method. A computing apparatus having connectivity to a network receives a service profile boot policy from a management device in the network. The service profile boot policy includes attributes identifying boot devices hosted by the computing apparatus. Data representing the service profile boot policy is stored and an order of boot devices hosted by the computing apparatus is generated. The order is generated according to the attributes of the service profile boot policy. Boot devices are excluded from the order according to the attributes of the service profile boot policy.

17 Claims, 4 Drawing Sheets

(56) References Cited

U.S. PATENT DOCUMENTS

| | | |
|---|---|---|
| 2009/0113198 A1 | 4/2009 | Liu et al. |
| 2009/0144537 A1* | 6/2009 | Morisawa .................. 713/2 |
| 2010/0023737 A1 | 1/2010 | Herzi et al. |
| 2011/0113229 A1* | 5/2011 | Itoh et al. .................. 713/2 |
| 2012/0054543 A1 | 3/2012 | Dreier |
| 2012/0158928 A1 | 6/2012 | Naddeo |
| 2012/0170548 A1 | 7/2012 | Rajagopalan et al. |
| 2012/0265910 A1 | 10/2012 | Galles et al. |
| 2013/0031342 A1 | 1/2013 | French |
| 2013/0080754 A1 | 3/2013 | Ganesh et al. |
| 2013/0138938 A1* | 5/2013 | Bang et al. .................. 713/2 |
| 2014/0156983 A1 | 6/2014 | Ganesh et al. |

* cited by examiner

STATELESS FLEXIBLE BOOT CONTROL

CROSS REFERENCE TO RELATED APPLICATIONS

This application is a continuation of U.S. patent application Ser. No. 13/705,403, filed Dec. 5, 2012, entitled "Stateless Flexible Boot Control," the entire contents of which are hereby incorporated by reference.

TECHNICAL FIELD

The present disclosure relates to optimizing boot order control for devices in data center environments.

BACKGROUND

In data center environments, a server may boot or reboot devices that it hosts, for example, to load or reload an operating system. The server may maintain a boot list that specifies a particular boot order for device types. The boot list may be utilized by a basic input/output system (BIOS) of the server to instruct the devices hosted by the network to boot or "turn on" in a particular order. The BIOS of the server is also configured to check the memory capacity of the server to ensure that the devices hosted by the server are able to boot. The speed at which the server is able to load or reload an operating system depends on the device types that are in the boot list. When the boot list is optimized, the operating system of the server can load more quickly.

DESCRIPTION OF EXAMPLE EMBODIMENTS

Overview

Techniques are provided herein for optimizing boot order for devices in a data center environment. These techniques may be embodied as a method, apparatus and instructions in a computer-readable storage media to perform the method. A computing apparatus having connectivity to a network receives a service profile boot policy from a management device in the network. The service profile boot policy includes attributes identifying boot devices hosted by the computing apparatus. Data representing the service profile boot policy is stored and an order of boot devices hosted by the computing apparatus is generated. The order is generated according to the attributes of the service profile boot policy. Boot devices are excluded from the order according to the attributes of the service profile boot policy.

Example Embodiments

Figure 1:
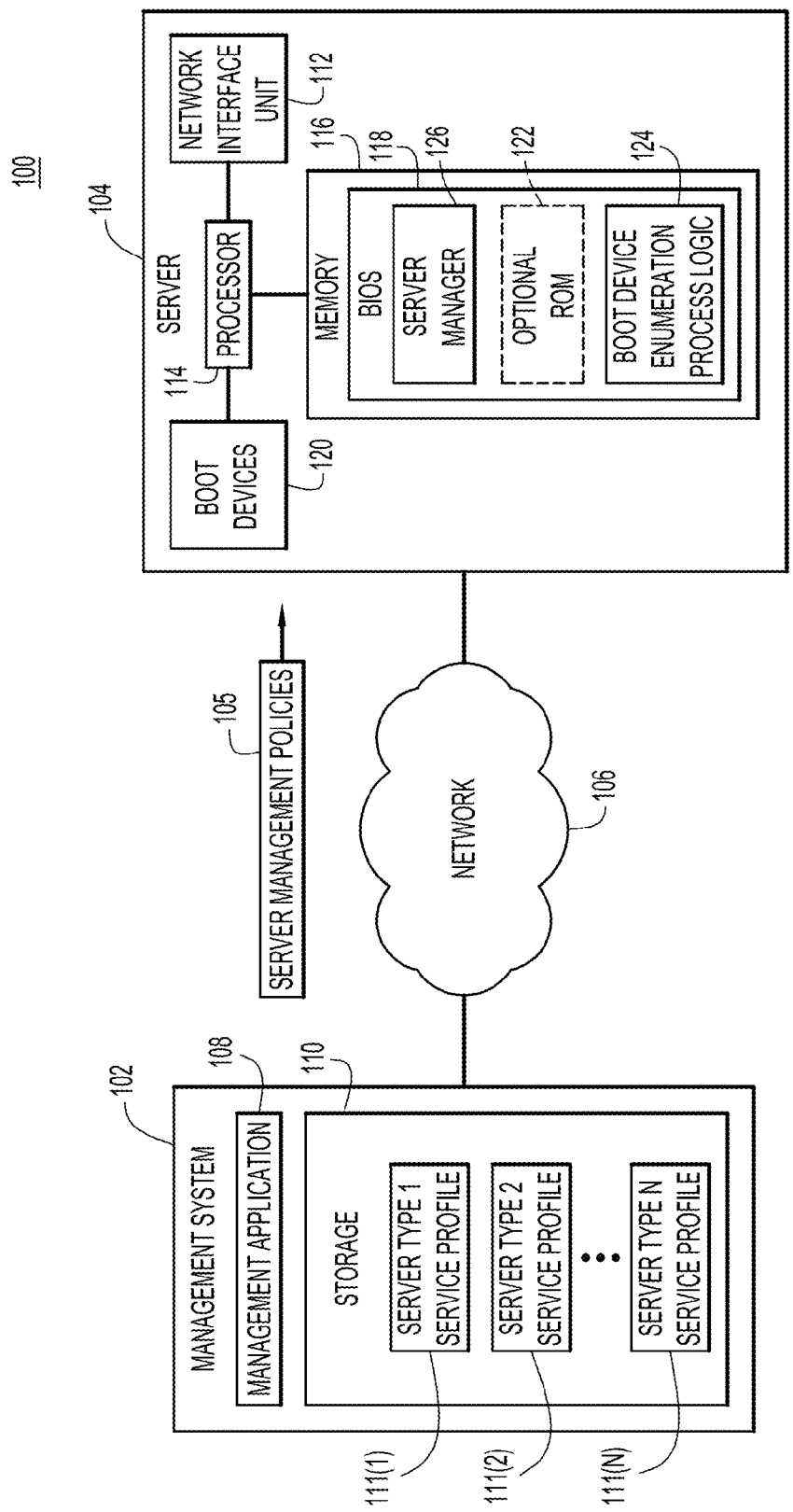
FIG. 1 shows an example data center environment with a management system that sends server management policies to a server for optimizing boot order control.

The techniques described herein relate to optimizing a boot order for data center devices. An example data center environment (e.g., "data center") 100 is illustrated in FIG. 1. The data center 100 has a management system device ("management system") shown at reference numeral 102. The data center 100 also has a server device ("server") shown at reference numeral 104. The management system 102 and the server 104 are configured to communicate with each other via a network (e.g., a wide area network (WAN) or local area network (LAN)), shown at reference numeral 106.

The management system 102 comprises a management application shown at reference numeral 108. The management application 108 may be a software or a hardware (e.g., an application specific integrated circuit (ASIC)) component of the management system 102. The management system 102 also has a storage unit (e.g., "storage") 110 that stores server profile information in the form of server type service profiles 111(1)-111(n) associated with different servers in the data center 100 with which the management system 102 communicates. For example, the storage 110 may be a memory component of the management system 102 that stores server profile information associated with a plurality of different types of servers, e.g., server type 1 service profile 111(1) to server type N service profile 111(N) in the data center 100. It should also be understood that the data center 100 may comprise other servers, and for simplicity, only one server is shown.

The management system 102 utilizes the management application 108 and the server profile information stored in the storage 110 to generate server management policies. As shown at reference 105 in FIG. 1, the server management policies are sent from the management system 102 to the server 104 across the network 106. The server 104 is configured to receive the server management policies from the management system 102, and the server 104 analyzes the server management policies to optimize the boot order control of devices that are operated by the server 104.

The management system 102 is configured to generate server management policies that are sent to the server 104. The server 104 receives the server management policies from the management system 102 in order to optimize boot order control, as described herein. The server 104 comprises several components. For example, as shown in FIG. 1, the server 104 has a network interface unit 112, a processor 114, a memory 116, a basic input/output system (BIOS) 118 and boot devices 120. Additionally, the server 104 has an optional read only memory (ROM) unit 122.

In general, the network interface unit 112 is configured to receive the server management policies from the management system 102 across the network 106. The processor 114 evaluates the management policies and utilizes the boot device enumeration process logic 124 in the memory 116 to optimize the boot order control of the boot devices 120, as described herein. The memory 116 also has a server manager database ("server manager") 126 to store boot order instructions. In one example, the boot device enumeration process logic 124 comprises executable instructions that when executed by the processor 114, cause the processor 114 to access the BIOS 118 to turn on or "boot" one or more of the boot devices 120 in accordance with the management policies that are received from the management system 102 in order to ultimately boot or load an operating system. Thus, in one example of the techniques presented herein, the management policies generated by the management system 102 and received by the server 104 set forth instructions that are utilized by the server 104 to optimize and prioritize the boot order of the boot devices 120 to load the operating system of the server 104.

The boot devices 120 in FIG. 1 may represent one or more devices that are controlled or hosted by the server 104. For example, the boot devices 120 may belong to one or more "boot device types." The boot device types may designate a group or family of particular devices. In one example, the boot devices 120 may include a hard disk drive (HDD) device type, a floppy disk drive (FDD) device type, a compact disc ROM (CD-ROM) device type, etc. Each of these device type groups may comprise several specific devices. For example, the HDD device type may comprise local disks, storage area networks (SANs), Internet Small Computer System Interfaces (ISCSIs), Universal Serial Buses (USBs), Secure Digital (SD) cards, etc. A floppy disk drive (FDD) device type may comprise, for example, a USB floppy disk drive, and a CD-ROM device type may comprise optical CD drives (e.g., a CD-read (CD-R) drive, a CD-read/write (CD-RW) drive, etc.). The devices in each device type may be enumerated in a particular order in a boot list stored by the server 104 (e.g., in the server manager 126).

Currently, when a server is powered on and begins to operate, the BIOS of the server instructs the server's processor to load or boot devices. However, current booting techniques allow the processor to order and re-order only the device types or groups and not the particular devices within the device types or groups. Thus, as the processor is instructed to perform reboot operations, the processor may reboot all of the particular devices that are enumerated in the device type. For example, the BIOS of the server may specify a reboot order for device types as follows:

[HDD]→[FDD]→[CD-ROM]

and particular devices in each device type (i.e., devices enumerated as HDD devices, FDD devices and CD-ROM devices) will be rebooted by the processor based on the order in which they are enumerated. Thus, in certain situations, particular devices that are intended to be rebooted may be skipped or ordered in a lower priority than intended. For example, if a server needs to reboot through a local disk, and if a SAN device is enumerated ahead of the local disk in the HDD device enumeration, the SAN device would be selected first in the HDD category. Additionally, in one example, only the SAN device may become part of the final boot device list (possibly excluding the local disk from the boot list altogether). As stated above, this is problematic because essential and/or intended devices may be entirely skipped from the boot list.

The techniques described herein resolve these shortcomings by providing flexible and stateless information to a server that allows the server to select the correct set of devices to boot. In particular, the management system 102 sends server management policies to the server 104 that contains information that the server 104 intelligently parses to enumerate only required devices to boot.

Referring back to FIG. 1, it is to be appreciated that the server 104 has the network interface unit 112 that is coupled to the processor 114. The network interface unit is configured to receive the server management policies (including the boot policy 202) from the management system 102. The processor 114 is, for example, a microprocessor or microcontroller that is configured to execute program logic instructions (i.e., software) for carrying out various operations and tasks described above. For example, the processor 114 is configured to execute boot device enumeration process logic 124 to enhance and optimize boot order control by enumerating necessary boot devices. The functions of the processor 114 may be implemented by logic encoded in one or more tangible computer readable storage media or devices (e.g., storage devices, compact discs, digital video discs, flash memory drives, etc. and embedded logic such as an ASIC, digital signal processor instructions, software that is executed by a processor, etc.).

The memory 116 may comprise read only memory (ROM), random access memory (RAM), magnetic disk storage media devices, optical storage media devices, flash memory devices, electrical, optical, or other physical/tangible (non-transitory) memory storage devices. The memory 116 stores software instructions for the boot device enumeration process logic 124. The memory 116 also stores the server manager 126 that, for example, stores the boot order of the server 104. Thus, in general, memory 116 may comprise one or more computer readable storage media (e.g., a memory storage device) encoded with software comprising computer executable instructions and when the software is executed (e.g., by the processor 114), it is operable to perform the operations described above for the boot device enumeration process logic 124.

The boot device enumeration process logic 124 may take any of a variety of forms, so as to be encoded in one or more tangible computer readable memory media or storage devices for execution, such as fixed logic or programmable logic (e.g., software/computer instructions executed by a processor). The processor 114 may be an ASIC that comprises fixed digital logic, or a combination thereof.

For example, the processor 114 may be embodied by digital logic gates in a fixed or programmable digital logic integrated circuit, which digital logic gates are configured to perform the boot device enumeration process logic 124. In general, the boot device enumeration process logic 124 may be embodied in one or more computer readable storage media encoded with software comprising computer executable instructions and when the software is executed operable to perform the operations described hereinafter.

Figure 2:
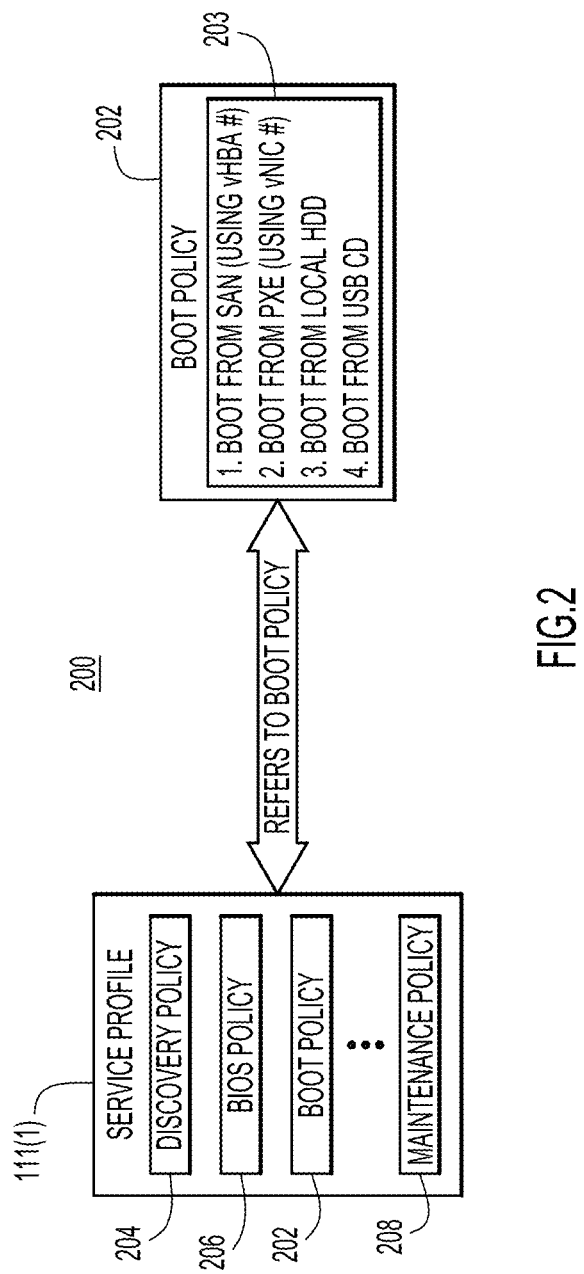
FIG. 2 shows an example diagram depicting an exchange of a boot policy between the management system and the server.

Reference is now made to FIG. 2. FIG. 2 shows a diagram depicting an example exchange 200 of a boot policy between the management system 102 and the server 104. In particular, FIG. 2 shows a server profile 111(1), for example, that is stored in the storage unit 110 of the management system 102. The service profile 111(1) may be any of the service profiles shown in FIG. 1, and it should be appreciated that the server profile 111(1) corresponds to the service profile that is associated with the server 104. The service profile 111(1) has several policies that are associated with the server 104. In one example, one or more of the policies may be sent to the server 104 as a part of the server management policies sent to the server 104, shown in FIG. 1 above. In particular, the service profile 111(1) has a boot policy 202 that is sent to the server 104. The boot policy 202 has boot order instructions that comprise attributes associated with the boot devices hosted by the server 104. It should be appreciated that the boot policy 202 may comprise instructions in the form of a data structure that indicates the boot priority order for particular device types. Upon receiving the boot policy 202 (e.g., as part of the server management policies exchanged between the management system 102 and the server 104), the server 104 analyzes the attributes in the instructions to determine a priority order for the boot devices. For example, as shown in FIG. 2, the boot policy 202 is analyzed by the server 104 to determine the boot order 203:

1. Boot from SAN (using a Virtual Host Bus Adapter (vHBA)).
2. Boot from a Pre-Boot Execution Environment (using a Virtual Network Interface Card (vNIC)).
3. Boot from a local HDD.
4. Boot from a USB CD.

It should be appreciated that the service profile 111(1) may also comprise, among other policies, a discovery policy 204, a BIOS policy 206 and a maintenance policy 208.

Figure 3:
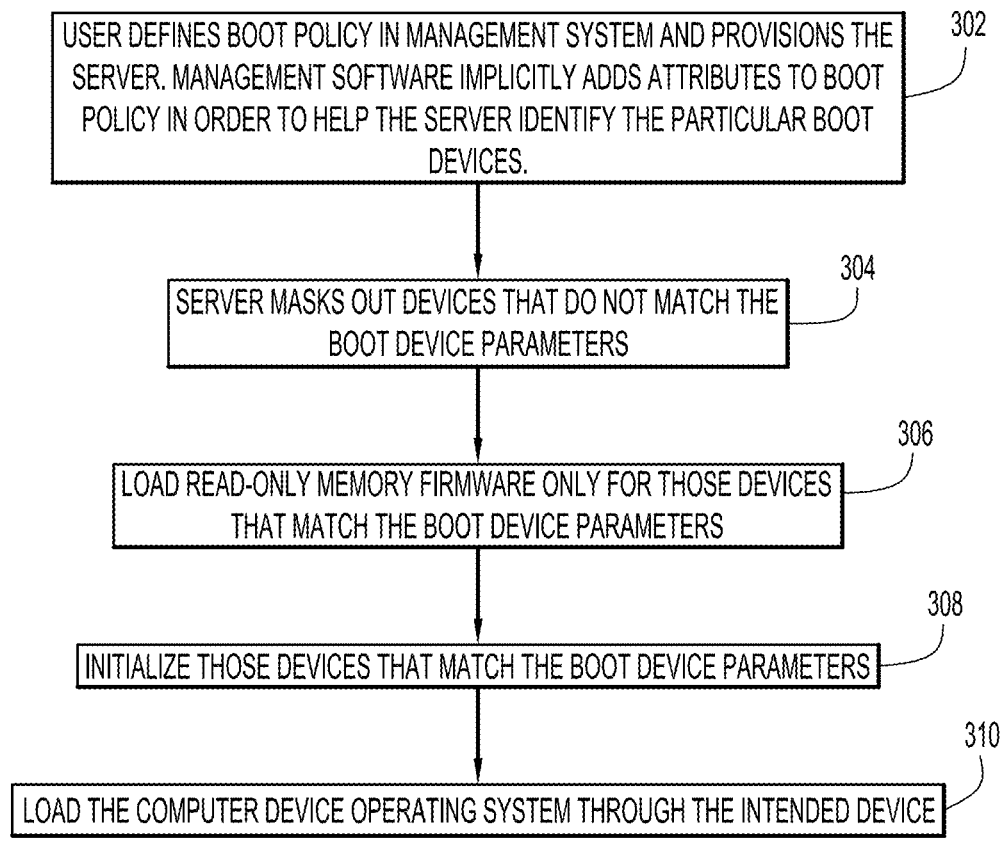
FIG. 3 shows an example flow chart depicting operations performed by the management system and the server for determining a priority boot order for boot devices.

Reference is now made to FIG. 3. FIG. 3 shows an example flow chart 300 depicting operations performed by the management system 102 and the server 104 for determining a priority order for boot devices. At operation 302, a user defines a boot policy in the management system 102 and provisions the server 104 accordingly. Management software of the management system 102 implicitly adds attributes to the boot policy 202 that allows the server 104 (e.g., firmware in the server 104) to identify the particular boot devices. The attributes may have boot connection vector (BCV) attributes and/or bootstrap entry vector (BEV) attributes that are associated with boot devices hosted by the server. In one example, the management software of the management system 102 adds a World Wide Port Name (WWPN) to identify a vHBA or Media Access Control (MAC) address of a vNIC.

At operation 304, the server 104 (e.g., the firmware of the server 104) masks out or removes devices hosted by the server 104 from an initialization process that do not match the boot device parameters or attributes set forth in the boot policy 202. At operation 306, the server 104 loads firmware (e.g., ROM firmware) only for those devices that match the boot device parameters or attributes in the boot policy 202, and at operation 308, the server 104 initializes these devices. When the server 104 initializes these devices, the server 104 may select a first one of the boot devices that belongs to a first device type that has a first priority in the priority order (e.g., a particular device in the HDD device type group). This first device is instructed to initialize. Likewise, the server 104 may then select a second one of the boot devices that belongs to a second device type that has a second priority in the priority order (e.g., a particular device in the FDD device type group). This second device is then instructed to initialize. At operation 310, the server 104 loads a computer device operating system using one or more of the boot devices that matches the boot device parameters or attributes in the boot policy 202. Once the operating system has been loaded, the server 104 may then terminate initialization of other boot devices.

Figure 4:
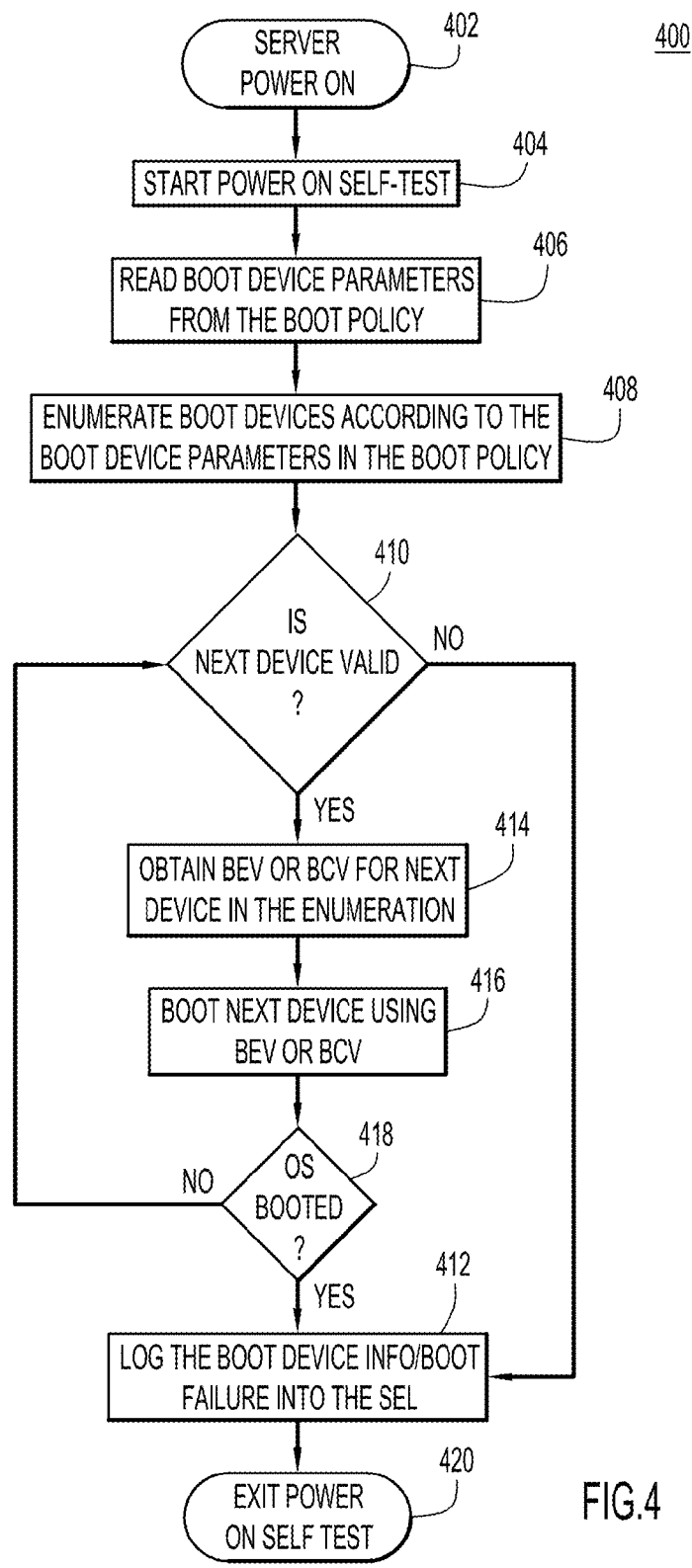
FIG. 4 shows an example flow chart depicting enhanced or optimized boot operations performed by the server to load or boot an operating system of the server.

Reference is now made to FIG. 4. FIG. 4 illustrates an example flow chart 400 that shows enhanced or optimized booting operations performed by the server 104 to load an operating system of the server 104. At operation 402, the server 102 powers on, and at operation 404, the server 104 starts a power on self-test. The server 104 then reads boot device parameters (or attributes) at operation 406 from, for example, the boot policy 202 received as a part of the server management policies described above. At operation 408, the boot devices are enumerated in a boot list according to the boot device parameters provided in the boot policy 202. The server 104 evaluates, at operation 410, the boot list to determine whether the next device (or in an initial case, the first device) is valid (e.g., whether the device matches the parameters provided in the boot policy). If not, the server 104, at operation 412, logs the boot device information and boot failure information into a system event log (SEL) of the server 104. If so (i.e., if the answer to operation 410 is "yes"), at operation 412, the server 104 obtains BEV and/or BCV attributes for the next device in the enumeration in the boot list. At operation 416, the server then boots the next device using the BEV or BCV attributes. The server 104 then determines, at operation 418, whether the operating system has been booted. If the operating system has not been booted, the server reverts to operation 410 to evaluate the next device in the boot list. If so, the boot device reverts to operation 412 to log the boot device/boot failure information into the SEL. At operation 420, the server 104 exits the power on self-test.

Thus, by the above techniques, boot order control is maintained at a centralized management entity (e.g., the management system 102), and stateless boot order instructions are provided to the server 104. The techniques described above avoid unintended device initialization code from executing during a server power on mode, thereby reducing the time to boot the operating system. In other words, the techniques described above allow the server 104 to accomplish enhanced or optimized booting control by enumerating only necessary devices to boot. As a result, the reboot time of the server 104 is reduced.

It should be appreciated that the techniques described above in connection with all embodiments may be performed by one or more computer readable storage media that is encoded with software comprising computer executable instructions to perform the methods and steps described herein. For example, the operations performed by the management system 102 and the server 104 may be performed by one or more computer or machine readable storage media (non-transitory) or device executed by a processor and comprising software, hardware or a combination of software and hardware to perform the techniques described herein.

In summary, a method is provided comprising: at a computing apparatus device having connectivity to a network, receiving a service profile boot policy from a management device in the network, wherein the service profile boot policy includes attributes identifying boot devices hosted by the computing apparatus; storing data representing the service profile boot policy; and generating an order of boot devices hosted by the computing apparatus according to the attributes of the service profile boot policy and excluding boot devices from the order according to the attributes of the service profile boot policy.

In addition, an apparatus is provided comprising: a network interface unit; a memory; and a processor coupled to the network interface unit and the memory, the processor being configured to: receive a service profile boot policy from a management device in the network, wherein the service profile boot policy includes attributes identifying boot devices; store data representing the service profile boot policy; and generate an order of boot devices according to the attributes of the service profile boot policy and excluding boot devices from the order according to the attributes of the service profile boot policy.

Furthermore, these techniques may be embodied in another form in which one or more computer readable storage media is encoded with software comprising computer executable instructions and when the software is executed operable to: receive a service profile boot policy from a management device in the network, wherein the service profile boot policy includes attributes identifying boot devices hosted by a computing apparatus; store data representing the service profile boot policy; and generate an order of boot devices hosted by the computing apparatus according to the attributes of the service profile boot policy and excluding from the order boot devices according to the attributes of the service profile boot policy.

The above description is intended by way of example only. Various modifications and structural changes may be made therein without departing from the scope of the concepts described herein and within the scope and range of equivalents of the claims.

What is claimed is:

1. A method comprising:
at a computing apparatus having connectivity to a network, receiving a stateless service profile boot policy from a management device remote from the computing apparatus in the network, wherein the service profile boot policy includes a flexible collection of attributes that can be parsed to identify boot devices of one or more device types hosted by the computing apparatus that are required to boot;
storing data representing the service profile boot policy;
analyzing the flexible collection of attributes in order to identify boot devices hosted by the computing apparatus that are required to boot; and
generating an order of boot devices from the boot devices hosted by the computing apparatus according to the attributes of the service profile boot policy and excluding boot devices from the order according to the attributes of the service profile boot policy, wherein the computing apparatus is configured to include boot devices of the same device type in different portions of the order.

2. The method of claim 1, wherein receiving comprises receiving the service profile boot policy in the form of a data structure that indicates the order for the boot devices.

3. The method of claim 1, further comprising loading an operating system of a processor of the computing apparatus using one or more of the boot devices that match attributes of the service profile boot policy.

4. The method of claim 3, further comprising terminating initialization of other boot devices when the operating system has been loaded.

5. The method of claim 1, wherein the service profile boot policy includes boot connection vector (BCV) attributes or bootstrap entry vector (BEV) attributes associated with the boot devices hosted by the computing apparatus.

6. The method of claim 5, further comprising analyzing the BCV attributes or the BEV attributes to determine the order for the boot devices.

7. The method of claim 6, wherein the analyzing is based further on data contained in a read only memory of the computing apparatus.

8. An apparatus comprising:
a network interface unit;
a memory; and
a processor coupled to the network interface unit and the memory, and configured to:
receive a stateless service profile boot policy from a management device remote from the apparatus in the network, wherein the service profile boot policy includes a flexible collection of attributes that can be parsed to identify boot devices of one or more device types that are required to boot;
store data representing the service profile boot policy;
analyze the flexible collection of attributes in order to identify boot devices hosted by the apparatus that are required to boot; and
generate an order of boot devices from the boot devices hosted by the apparatus according to the attributes of the service profile boot policy and excluding boot devices from the order according to the attributes of the service profile boot policy, wherein the processor is configured to include boot devices of the same device type in different portions of the order.

9. The apparatus of claim 8, wherein the processor is further configured to receive the service profile boot policy in the form of a data structure that indicates the order for the boot devices.

10. The apparatus of claim 8, wherein the processor is further configured to:
load an operating system using one or more of the boot devices that match attributes of the service profile boot policy; and
terminate initialization of other boot devices when the operating system has been loaded.

11. The apparatus of claim 8, wherein the service profile boot policy includes boot connection vector (BCV) attributes or bootstrap entry vector (BEV) attributes associated with the boot devices.

12. The apparatus of claim 11, wherein the processor is further configured to analyze the BCV attributes or the BEV attributes to determine the order for the boot devices.

13. The apparatus of claim 12, wherein the processor is further configured to analyze based on data contained in a read only memory.

14. A non-transitory computer-readable storage media encoded with software comprising computer executable instructions and when the software is executed operable to:
receive a stateless service profile boot policy from a management device remote from a computing apparatus in the network, wherein the service profile boot policy includes a flexible collection of attributes that can be parsed to identify boot devices of one or more device types hosted by the computing apparatus that are required to boot;
store data representing the service profile boot policy;
analyze the flexible collection of attributes in order to identify boot devices hosted by the computing apparatus that are required to boot; and
generate an order of boot devices from the boot devices hosted by the computing apparatus according to the attributes of the service profile boot policy and excluding from the order boot devices according to the attributes of the service profile boot policy, wherein the software is configured to include boot devices of the same device type in different portions of the order.

15. The computer-readable storage media of claim 14, wherein the instructions operable to receive comprise instructions operable to receive the service profile boot policy in the form of a data structure that indicates the order for the boot devices.

16. The computer-readable storage media of claim 14, further comprising instructions operable to:
load an operating system of a processor of the computing apparatus using one or more of the boot devices that match attributes of the service profile boot policy; and
terminate initialization of other boot devices when the operating system has been loaded.

17. The computer-readable storage media of claim 14, wherein the service profile boot policy includes boot connection vector (BCV) attributes or bootstrap entry vector (BEV) attributes associated with the boot devices hosted by the computing apparatus and the computer-readable storage media further comprises instructions operable to:
analyze the BCV attributes or the BEV attributes based on data contained in a read only memory of the computing apparatus to determine the order for the boot devices.

* * * * *